June 2, 1925.  
M. SCHIESARI  
AUTOMOBILE BUMPER  
Filed May 26, 1924
1,539,873
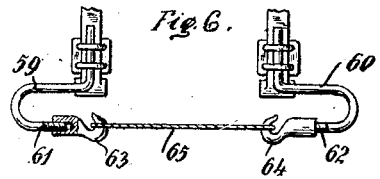
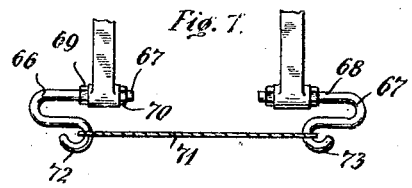
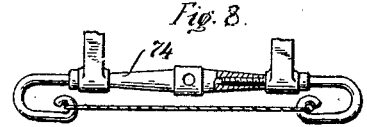
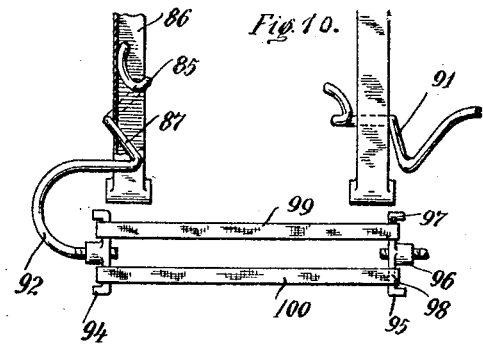
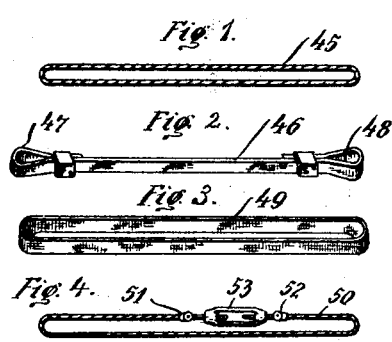
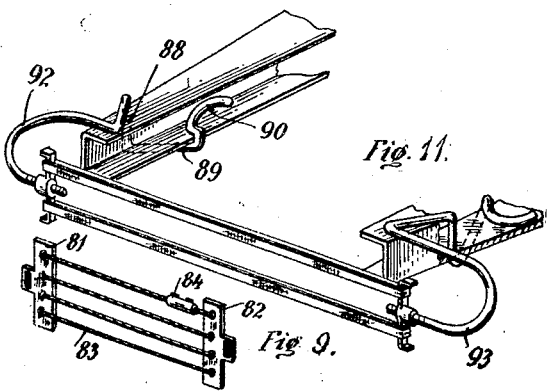
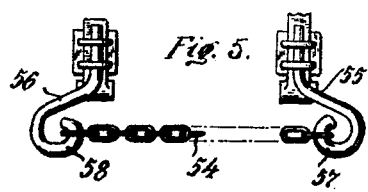
Inventor  
Mario Schiesari Patented June 2, 1925.

1,539,873

UNITED STATES PATENT OFFICE.

MARIO SCHIESARI, OF NEW YORK, N. Y.

AUTOMOBILE BUMPER.

Application filed May 26, 1924. Serial No. 715,861.

*To all whom it may concern:*

Be it known that I, MARIO SCHIESARI, a citizen of the United States, residing in the city of New York, county and State of New York, have invented certain new and useful Improvements in Automobile Bumpers, of which the following is a specification.

This invention relates to automobile bumpers, and its main object is to provide a novel and improved type of bumper, possessing a high resiliency due to the employment of flexible elements in place of the relatively rigid cross members now in use in the majority of bumpers.

Another object of this invention is to provide an automobile bumper of a novel and improved construction, causing the same to be practically free of the possibility of permanent deformation to which ordinary bumpers are subject owing to their relative rigidity; said bumper furthermore being of light weight, easily demountable and adapted to be conveniently packed and shipped in packages of relatively small bulk.

Additional objects and advantages of this invention will more fully appear from the following description, and will be set forth in the appended claims.

Automobile bumpers of the types generally used, usually comprise one or more cross bars extending at the front or rear of the car, or both, said bars being of flat steel bent to form resilient loops at the sides of the device, and being attached to the chassis of the car in some suitable manner. The resiliency of these devices is practically entirely dependent upon their side spring portions, the cross members, proper, being substantially rigid; therefore, as such, they are subject to be easily deformed and permanently put out of commission, when some violent shock is experienced due to collision or to some other accident.

Owing to their construction, these devices are relatively heavy and bulky, their cost of production is rather high, and they entail considerable expense for packing and shipping, and for storing, on account of their bulk.

The bumper forming the object of the present invention, is an improvement over the existing types, doing away with these objectionable features, by utilizing a new method of construction which permits of obtaining a device of superior resiliency and efficiency.

The fundamental features of my invention are illustrated in the drawings, in which:

Figs. 1, 2, 3, and 4, are detail views each illustrating a different type of flexible cross member adapted to be employed in connection with my device.

Figs. 5, 6, 7, and 8, are plan views of several types of devices, showing various ways in which the features of my invention may be carried into practice;

Fig. 9 is a detail view in perspective of a different style of cross member, which may be employed in connection with my device;

Fig. 10 is a fragmentary plan view of a self clamping bumper also embodying my invention; and, Fig. 11 is a view in perspective of the same.

The main feature of my invention, which is embodied in all the types of devices shown, is the substitution of a flexible cross member in place of the relatively rigid cross member ordinarily employed; said flexible cross member being adapted to be set in operative position by attaching it to the side members in some suitable manner. Furthermore, the resulting device is preferably of such a design as to allow the adjustment of the tension at which the cross member is set, various methods of attaining this end being illustrated in the drawings.

A device made according to my invention, is much easier to produce than bumpers of the ordinary types; it is made of smaller parts, and it requires less labor, less material, and less initial investment for manufacturing facilities. And in addition to these advantages, its resiliency and efficiency are also relatively higher.

The device illustrated in Fig. 6, comprises two side members, 59, 60, attached to the chassis by securing to it their rearwardly extending end portions by means of U-bolts, as shown.

Said side members have their outer ends, 61, 62, directed inwardly, and threaded, preferably in opposite directions.

On these threaded ends are inserted hooks 63, 64, between which is stretched a flexible cross member 65. The hooks are at first turned to cause them to move inwardly, to allow free insertion of the cross member in position, and then are turned in the opposite direction, moving apart from each other, and stretching the cross member more or less, as may be desired.

The cross member may be of the type shown at 45 in Fig. 1, in which the ends of the cable are spliced to form an endless belt. The same then becomes a flat ring, the ends of which form loops which may be inserted over extensions 94, 95. Or else the cable may be substituted by a flat rope, or by a band, such as shown at 46 in Fig. 2, where the ends of the rope are folded over to form loops 47, 48, or by a flat rope or band with the ends joined to form an endless belt, such as shown at 49, in Fig. 3.

A flexible member of this description may be made of steel cable, or of steel rope, or of canvas, or of steel band, or leather, or any other suitable material. It may be desirable, in some cases, to provide means whereby the tension of the cross member may be increased or decreased at will.

One way of attaining this end is illustrated in Fig. 4, where it is seen that the cross member consists of a cable 50, the ends of which are provided with sockets 51, 52, connected by a turnbuckle 53, completing the endless belt. It is obvious, that by means of the turnbuckle the length of the belt may be adjusted so that the tension exerted by the side members will be greater or smaller at will.

In Fig. 5 I illustrate a device, where the cross member consists of a length of chain 54, its end links being inserted over the side members. The side members 55, 56, have outwardly extending portions 57, 58, being in the form of a spiral spring, forming an open eye attachment for the links of the chain. It is obvious, that in this case the tension may be adjusted by inserting one or another of the intermediate links over the attaching end of the side member.

The side members are shown attached to the chassis in the manner previously described; but it is obvious that the same may be formed of flat stock, if desired, and bolted to the sides of the chassis.

In Fig. 7, the side members are made adjustable inwardly or outwardly. The same, designated by characters 66, 67, consist of a bar formed to provide a crosswise stem 67, 68, inserted at the end of the chassis, and adapted to thus act as attachment for the body springs.

Said stem is threaded, so that by operating nuts 69, 70, its lateral position may be adjusted, so as to stretch more or less the cross member 71, attached to the hook shaped outer ends 72, 73, of said side members.

A somewhat similar scheme is illustrated in Fig. 8, where it is seen that inner nuts 67 have been replaced by a turnbuckle connection 74 between the two stems.

The range of protection given by the device, and its resistance, may be increased by multiplying the number of cross members employed. In Fig. 9 it may be seen how the cross members shown in Figs. 5, 6, 7, 8, may be replaced by another consisting of two side plates 81, 82, adapted to be attached to the side members, and a plurality of flexible cross members 83 connecting said plates to each other. Said plurality of cross members may also be formed, as shown, by a single cable extending back and forth from one plate to the other, its two ends being joined by means of a clamp 84. In this way practically the entire front or rear surface of a car may be protected.

In Figs. 10, 11, I illustrate still another type of device, which is adapted to be set in place without the use of any bolt or other fastening means, except the tension of the device itself.

In this device, the side members are formed at 85 in Fig. 10, to embrace the channel shape of the side of the chassis, 86, their inner portions being bent to form an upper portion 87, a downward portion 88, a lower portion 89, and an inner hook portion 90. Each member may be inserted in position as shown at 91 in Fig. 10, with its lower portion 89 in a crosswise direction to the chassis. Then by turning the member inwardly, the hook portion 90 will engage the lower rib of the channel shape, and the upper and lower portions will extend along the upper and lower surfaces of said shape; and by increasing the pressure, the side member will clamp the channel shape between its downward portion 88 and its hook portion 90.

The necessary force is provided by the tension exerted on the cross member. This may be obtained by threading the inwardly directed ends of the outer extensions 92, 93 of the side members, as explained in connection with the device of Fig. 6. Suitable means for holding the cross member or members may then be screwed on said ends, as shown for instance at 94, 95. Said holding means are shown in the form of a cross head, comprising a hub 96 and two radial extensions 97, 98, to which two cross members are secured, as shown at 99, 100.

By turning holding members 94, 95, one way or the other, the cross members may be stretched more or less, as previously explained; and the tension exerted by the same will firmly hold the side members in position.

I prefer, in this instance, to use more than one cross member, because in case one breaks owing to an impact, the other or others will still maintain the device in operative position; whereas, if only one cross member is employed, the entire device would come apart, should the cross member be broken.

By holding the cross members under tension, quite a firm grip may be exerted by the side members; and it will also be observed, that no slippage of the device is possible owing to the front pressure exerted by a sudden impact, inasmuch as said pressure further increases the tension of the cross members, and tends therefore to tighten the grip.

For an efficient protective action, it is of course always better to cover as much surface as possible, by increasing the number of cross members, as shown, for instance, in Fig. 9. However, the same purpose may be attained by stretching between the side members a piece of wire cloth, or a piece of strong canvas, or some other suitable flexible cross member of relatively large width.

From the foregoing it is seen that I provide an entirely novel type of bumper whereby numerous advantages may be obtained. The use of a flexible cross member, as explained, increases the resiliency and the resistance of the device, and permits a tension adjustment which is not possible to obtain by means of the ordinary types of bumpers.

Furthermore, by increasing the number or the width of the cross members, it is possible to obtain an efficient protection over a relatively large surface, without appreciably increasing the weight of the device, and its cost. The flexibility of the cross member employed, facilitates the disentangling of the car when a collision occurs, and prevents furthermore the danger of permanent deformation of or injury to the bumper. In case the cross member should break or give way owing to the force of the impact, it can be easily and quickly replaced, since a spare cross member may be carried folded up in compact form, as a regular article of car equipment.

The drawings are intended for illustrative purposes only, and not in a limiting sense. It is obvious that my invention may be carried out in ways different from those shown; and therefore I reserve myself the right to modify the construction of the device in all those ways and manners which may be suggested by engineering and practical considerations, and which may enter, fairly, into the scope of the appended claims.

I claim:

1. In a device of the class described, two side members adapted to interlock with parts of an automobile frame, and a cross member held under tension between said side members, the tension exerted thereby causing said side members to remain clamped to said frame.

2. In a device of the class described, two side holding members adapted to interlock with the side members of an automobile frame, a cross member adapted to be held under tension between said side holding members, and means for adjusting the tension of said cross member, the tension thereof causing said side holding members to remain clamped on to said frame side members.

3. In a device of the class described, two side holding members adapted to interlock with the side members of an automobile frame, a flexible cross member adapted to be held under tension between said side holding members, and means for adjusting the tension of said cross member, the tension thereof causing said side holding members to remain clamped on to said frame side members.

4. In a device of the class described, two resilient side holding members adapted to interlock with the side members of an automobile frame, a flexible cross member adapted to be held under tension between said side holding members, and means for adjusting the tension of said cross member, the tension thereof causing said side holding members to remain clamped on to said frame side members.

5. In a device of the class described, two side holding members adapted to be secured to the side members of an automobile frame, said holding members being formed each with an inwardly directed portion, an adjusting member screwed on each inwardly directed portion, and a flexible member connecting said adjusting members to each other.

6. In a device of the class described, two resilient side holding members adapted to be secured to the side members of an automobile frame, said holding members being each formed with an inwardly directed portion, and a turnbuckle connection between said two inwardly directed portions, said connection comprising two end adjusting members, and a flexible member attached to said end members.

7. In a device of the class described, two resilient side holding members adapted to be secured to the side members of an automobile frame, said holding members being each formed with an inwardly directed portion, and a turnbuckle connection between said two inwardly directed portions, said connection comprising two end adjusting members, and a plurality of flexible members stretched between said end members.

MARIO SCHIESARI.